H. KERNGOOD.
SCREW STUD FOR SNAP FASTENERS.
APPLICATION FILED OCT. 19, 1910.
991,156.
Patented May 2, 1911.
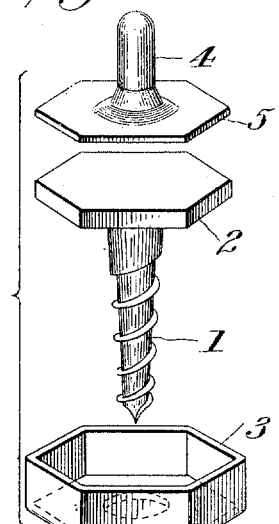
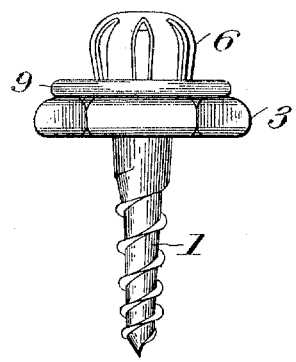
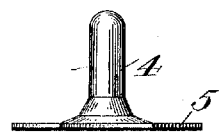
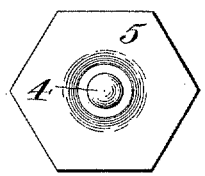
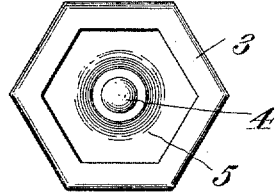
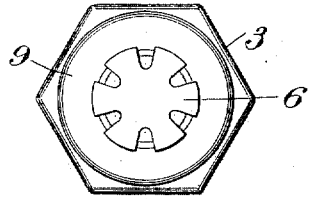
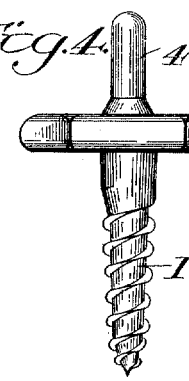
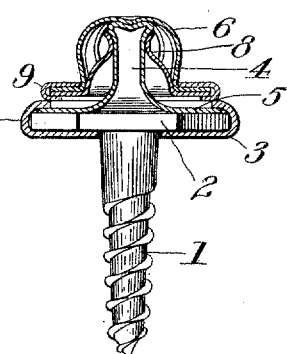
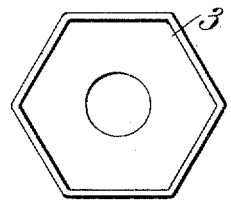
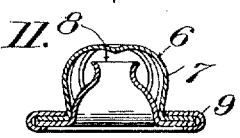
Witnesses
C. W. Walker
Lillie M. Perry.
Inventor
Herman Kerngood
by W. H. Luwell
Attorney
THE NORRIS PETERS CO., WASHINGTON, D. C.

UNITED STATES PATENT OFFICE.

HERMAN KERNGOOD, OF BALTIMORE, MARYLAND, ASSIGNOR TO ALMA MANUFACTURING COMPANY OF BALTIMORE CITY, OF BALTIMORE, MARYLAND, A CORPORATION OF MARYLAND.

SCREW-STUD FOR SNAP-FASTENERS.

991,156.  Specification of Letters Patent.  Patented May 2, 1911.

Application filed October 19, 1910. Serial No. 587,957.

*To all whom it may concern:*

Be it known that I, HERMAN KERNGOOD, a citizen of the United States, residing at Baltimore, in the State of Maryland, have invented a certain new and useful Improvement in Screw-Studs for Snap-Fasteners, of which the following is a full, clear, and exact description.

The use of fastening devices, commonly known as snap fasteners, and consisting of a socket member, corresponding in purpose to a buttonhole, and a head or stud, corresponding in purpose to a button, and adapted for coöperation with the socket, has been extended to a variety of articles other than gloves and other personal wear. When a spring socket is used, its complemental stud is rigid, and when a rigid socket is used, its complemental stud is resilient.

The covers or curtains of automobiles, carriages, and other vehicles, have been supplied with these snap fasteners, to hold them in place, and such covers or curtains are movable or removable; and rugs and carpets also have been supplied with snap fasteners for a like purpose. In some instances, the stud or head has been applied to a screw which forms the medium for attaching the stud or head to the woodwork or other support for the stud.

One way of connecting the stud or head to a screw has been to solder them together, but this is an insecure, costly, and unsightly way of connecting the two, and it is the object of the present invention to avoid these objections, and to provide a screw-mounted stud or head of durable, efficient, sightly, and relatively inexpensive construction.

The invention consists in a screw having a head, and a collet applied to the head, said collet engaging a rivet or eyelet having a flange, and this eyelet, in turn, engaging the head or stud proper to secure it to its screw fastening and support.

In the accompanying drawings, illustrating the invention, in the several figures of which like parts are similarly designated, Figure 1 is a perspective view illustrating the three parts detached of one form of stud support; Fig. 2 is a side elevation of the stud and its support assembled; Fig. 3 is a top plan view, and Fig. 4 is a side elevation of the screw support for the stud; Fig. 5 is a top plan view, and Fig. 6 is a sectional elevation of the complete screw stud; Fig. 7 is an elevation, and Fig. 8 is a plan view of the stud attaching rivet or eyelet; Fig. 9 is a side elevation and Fig. 10 is a plan view of the collet; and Fig. 11 is a cross-section of one form of spring stud detached.

The screw 1, employed may be of any suitable construction for use on wooden structures or on metal structures, but its head 2 preferably is flat and polygonal. A collet 3 of a shape complemental to the head 2 is adapted to be slipped onto the screw so as to inclose its head, and the rivet or closed-end eyelet 4 having a polygonal flange 5 corresponding in shape with the polygonal head 2 and collet 3, is then inserted in the collet so as to rest upon the top of the screw head 2, and then the flange of the collet is closed in over the flange of the rivet or eyelet and the three parts thus intimately united. Of course, the form of attaching medium or element (4) will vary with the kind of stud or other device being secured to the screw.

The spring stud or head 6, shown in Figs. 2, 5, 6 and 11 has an outside spring element 7, an inner eyelet 8, and a binder or collet 9 to unite these two parts, all substantially as shown in my Patents No. 832,579, dated October 2, 1906, and No. 857,559, dated June 18, 1907, and in order to secure this spring stud to the screw support the rivet or eyelet 4 is passed up into the inner eyelet 8 and by means of suitable tools clenched therein as indicated in Fig. 6, so that the spring stud is positively and mechanically connected with its screw base or fastening device, and without the use of solder or other readily frangible joint.

My invention is applicable equally to a screw having a polygonal head and to one having a round head.

It is obvious that a wrench must be used to screw the studs in place.

I wish it to be understood that my invention may be given other forms so long as they embody the feature of a mechanical union of the screw shank and the stud head solely by means of an attaching medium applied to the screw head by a collet.

Of course, the invention is not limited to the employment of a spring stud either of the kind herein particularly illustrated and described, or any other kind, since it is obviously applicable to any form of stud, either resilient or rigid, as, for example, that shown in my Patent No. 760,875 dated May 24, 1904.

While the screw fastening is especially designed for supporting a stud for a snap fastener, obviously its utility is not limited to that one purpose.

As already sufficiently indicated, the shape of the screw-head or disk may be varied; that is to say, a round or an angular head is equally applicable to a screw with an integral head or one with an applied head.

An instance of a screw-shank with an applied head is shown in my case filed February 23, 1911, Serial No. 610,220.

What I claim is:—

A screw stud for snap fasteners, comprising a screw having a head, a collet applied to said head, a stud-attaching element applied to the screw and secured thereto by the collet, and a stud engaged by the said attaching element and secured to the screw solely thereby.

In testimony whereof I have hereunto set my hand this 17th day of October A. D. 1910.

HERMAN KERNGOOD.

Witnesses:
J. G. ROSENHEIM,
NELLIE DOYLE.

---

Copies of this patent may be obtained for five cents each, by addressing the "Commissioner of Patents, Washington, D. C."